United States Patent

Svanstrom

[15] 3,661,557

[45] May 9, 1972

[54] PROCESS FOR THE PRODUCTION OF METAL POWDER

[72] Inventor: Elis Kjell Ake Svanstrom, Nynashamn, Sweden

[73] Assignee: Rederiaktrebolaget Nordstjernan

[22] Filed: Aug. 20, 1969

[21] Appl. No.: 851,746

[30] Foreign Application Priority Data

Aug. 23, 1968 Sweden..............................11368/68

[52] U.S. Cl. ...............................................75/0.5 BB, 75/84
[51] Int. Cl......................B22f 9/00, C22b 5/12, C22b 57/00
[58] Field of Search .........................................75/0.5 BB, 84

[56] References Cited

UNITED STATES PATENTS

| | | | |
|---|---|---|---|
| 3,062,638 | 11/1962 | Culbertson et al.................. | 75/0.5 BB |
| 3,341,320 | 9/1967 | Smiley................................. | 75/0.5 BB |

FOREIGN PATENTS OR APPLICATIONS 702,612    1/1965    Canada......................................75/0.5

Primary Examiner—L. Dewayne Rutledge
Assistant Examiner—W. W. Stallard
Attorney—Sommers & Young

[57] ABSTRACT

The invention relates to a process for affecting grain growth in the production of metal powder from the metals W, Mo, Ta, Nb or Re or from alloys comprising one or several of these metals, by reduction in a gas phase of the metal halides by means of hydrogen gas. The reduction may be carried out in one or several steps so that partially or completely reduced metal powder is obtained. If there is partially reduced metal powder, this powder is exposed to at least one additional treatment consisting of the mechanical decomposition of the powder and/or heat treatment at a temperature of 400°–1,200° C., preferably 700°–1,100° C. in an atmosphere containing some form of halogen. If there is a completely reduced metal powder, this powder is exposed to at least one additional treatment consisting of either a heat treatment at a temperature of 400°–1,200° C., preferably 700°–1,100° C. in an atmosphere containing some form of halogen or the mechanical decomposition of the powder followed by said heat treatment.

9 Claims, No Drawings

PROCESS FOR THE PRODUCTION OF METAL POWDER

According to a previously known proposal for the production of metal powder by the reduction of metal halides by hydrogen gas in a gas phase, the reduction is carried out in two steps, the first step being controlled so that the product is partially reduced and the final reduction taking place in the second step at higher temperatures in order to affect the grain growth. The metals relevant in this connection are W, Mo, Ta, Nb or Re and alloys thereof. The halide is preferably a chloride. The reduction in the first step is partial, and it is carried out at a low reduction rate with the intention that the remaining halides should have a graincoarsening effect in the reduction in the second step. The low reduction rate is achieved by carrying out the reduction at low temperatures preferably in the range of 450°–750° C. In the second step the reduction is carried out at a higher reduction rate, which is achieved by using a higher temperature, preferably in the range of 900°–1,300° C.

Metal powder (e.g. tungsten powder) produced by a gas-phase-reduction of metal chlorides (e.g. tungsten chlorides) with hydrogen gas in one step is very fine-grained and has besides a very low volume weight (e.g. 0.15–0.5 g/cm$^3$). If this powder is post-reduced in a second step in order to remove the remaining amount of chlorine one obtains at the same time a controlled grain growth.

The reduction of metal halides in a gas phase in one step with hydrogen as a reducing agent thus generally produces very fine-grained powders as a result. An example of this is tungsten and its alloys, e.g. with rhenium or molybdenum, which are produced with particle sizes of about 0.1 μm BET or less.

This material is too fine-grained in most applications. In addition the powder may be pyrophoric which means a handling problem, and it has a relatively high oxygen content. In these respects grain growth improves the properties of the powder. In certain applications, e.g. for hammering and wire drawing, coarse powders (3–5 μm Fisher) are required in order to apply the process in practice.

The intention of the present invention is in the first place to meet the requirement for coarse-grained powders. It is a development of the above-mentioned proposal which describes a two-step process for achieving the controlled grain growth of metal powders. The object of the present invention is to achieve an additional grain growth and according to the present invention this is mainly achieved by exposing the powder to at least one additional treatment, this treatment consisting either of a mechanical decomposition of the powder, for instance by grinding or by means of a heat treatment in a special atmosphere of both.

The powder which is obtained after the first partial reduction is highly aggregated and consists to a large extent of more of less forked or branched chains of metal particles. In the final reduction the particles in these aggregates will be reduced in number while their size will increase simultanously. It has proved possible further to affect the grain growth process by first mechanically decomposing the powder, which may be done by grinding it in a ball mill and then exposing it to a special heat treatment or a final reduction. The mechanical decomposition of the powder has rather the character of a decomposition of the agglomerates or a de-aggregation than a proper grinding. The degree of de-aggregation has proved to have an effect on the particle sixe of the resulting powder as well as on its volume weight.

The grain growth occurs mainly by a material transformation from fine to coarse particles. It is therefore advantageous to mix coarse-grained and fine-grained powders prior to the special heat treatment or prior to the final reduction. The mixture should suitably but not necessarily consist of de-aggregated powder, in which case a better grain-coarsening effect is achieved in the heat treatment or the final reduction.

The above-mentioned additional heat treatment shall be carried out at a temperature of 400°–1,200° C. in an atmosphere containing some form of halogen. In this case one may use the halogen gas which corresponds to the reduced halide. The halogen gas shall however be strongly diluted since otherwise a complete halogenation will take place. The halogen gas shall only serve as a material transforming agent in the grain growth process. The dilution is carried out by means of neutral or inert gases.

It is also possible to use halide gas in the heat treatment and even in this case preferably the same type of halide which has been used earlier in the process. In this case too a dilution of the gas is often advantageous.

An especially favorable effect has been obtained with an atmosphere of hydrogen halide. Investigations have proved that e.g. tungsten powder in the heat treatment with hydrogen chloride has resulted in a rapid grain growth at temperatures between 800° and 1,200° C. The effect of the growth may already be observed at 400° C. and it rises markedly with a rising temperature. However, the rising effect of the growth is diminishing at temperatures above 1,100° C., and the upper temperature limit for the heat treatment lies at the temperature when sintering starts.

A lower temperature may be compensated by a longer period of treatment, but temperatures between 800° and 1,100° C. would seem to be of interest in practice, which temperatures normally mean a heat treatment lasting between 1 and 50 hours.

Good grain growth effects have been achieved by a heat treatment according to the above without any prior decomposition of the powder by grinding. Different variations in the particle size may be obtained by either carrying out this heat treatment with partially reduced powder or with completely reduced powder. In the heat treatment one may also mix fine-grained powder with coarse-grained irrespective of its being partially or completely reduced.

The present invention is made more clear by the following examples of treatment of W-powder:

EXAMPLE 1

A pre-reduced powder with a volume weight of 0.17 g/cm$^3$ was post-reduced for 1 hour at 1,200° C. The powder obtained had a particle size of 0.48 μm BET (specific surface = 0.65 m$^2$/g) and a volume weight of 2.7 g/cm$^3$. The same type of powder was ground to a volume weight of 2.7 g/cm$^3$ and post-treated in accordance with the above. The result was a powder with a particle size of 1.62 μm BET (specific surface = 0.19 m$^2$/g) and a volume weight of 7.0 g/cm$^3$.

EXAMPLE 2

A pre-reduced powder with a volume weight of 0.71 g/cm$^3$ was post-reduced for 1 hour at 1,200° C. The powder obtained had a volume weight of 1.2 g/cm$^3$ and a particle size of 0.52 μm BET. If, prior to the post-reduction, the powder was ground to a volume weight of 3.12 and 3.42 g/cm$^3$ respectively and if it was exposed to the same post-treatment, it had a volume weight of 4.0 and 4.32 g/cm$^3$ and a particle size of 0.68 μm BET and 0.72 μm BET respectively.

EXAMPLE 3

A pre-reduced powder with a particle size of 0.10 μm BET was treated for 1 hour at 800° C. in flowing hydrogen chloride gas which was then changed to hydrogen for half an hour. The particle size of the powder had increased to 0.25 μm BET. The identical treatment at 1,100° C. resulted in a particle size of 0.72 μm BET.

EXAMPLE 4

A pre-reduced powder with a particle size of 0.28 μm BET was treated at 1,000° C. for 50 hours in the same way as that in Example 1. The particle size was 1.6 μm BET.

EXAMPLE 5

A pre-reduced powder with a particle size of 0.10 μm BET was treated at 1,000° C for 10 hours with a mixture of hydrogen chloride and hydrogen gas, followed by pure hydrogen gas for half an hour. The particle size increased to 0.96 μm BET.

EXAMPLE 6

A post-reduced powder with a particle size of 0.28 μm BET was treated for 1 hour with hydrogen chloride gas at 1,100° C. The particle size had increased to 0.60 μm BET after the treatment.

What I claim:

1. In a method for affecting grain growth in the production of metal powder of metals selected from the group consisting of W, Mo, Ta, Nb, Re and alloys thereof by reducing a corresponding metal halide in a gas phase by means of hydrogen gas, the improvement comprising the following steps in the order named:
   a. reducing the halide to form a partially reduced powder;
   b. comminuting the powder mechanically; and
   c. further reducing the powder to form a completely reduced metal powder.

2. In a method for affecting grain growth in the production of metal powder of metals selected from the group consisting of W, Mo, Ta, Nb, Re and alloys thereof by reducing a corresponding metal halide in a gas phase by means of hydrogen gas, the improvement comprising the following steps in the order named:
   a. reducing the halide to form a partially reduced powder;
   b. comminuting the powder mechanically;
   c. treating the powder at a temperature of 400–1,200° C. in an atmosphere comprising a halogen; and
   d. further reducing the powder to form a completely reduced metal powder.

3. A method as recited in claim 2, wherein the treating atmosphere consists of hydrogen halide gas.

4. In a method for affecting grain growth in the production of metal powder of metals selected from the group consisting of W, Mo, Ta, Nb, Re, and alloys thereof by reducing a corresponding metal halide in a gas phase by means of hydrogen gas, the improvement comprising the following steps in the order named:
   a. reducing the halide to form a completely reduced metal powder;
   b. comminuting the metal powder mechanically; and
   c. treating the metal powder at a temperature of 400–1,200° C. in an atmosphere comprising a halogen.

5. In a method for affecting grain growth in the production of metal powder of metals selected from the group consisting of W, Mo, Ta, Nb, Re and alloys thereof by reducing a corresponding metal halide in a gas phase by means of hydrogen gas, the improvement comprising the following steps in the order named:
   a. reducing the halide to form a partially reduced powder;
   b. mixing coarse-grained and fine-grained partially reduced powder;
   c. comminuting the powder mechanically; and
   d. further reducing the powder to form a completely reduced metal powder.

6. In a method for affecting grain growth in the production of metal powder of metals selected from the group consisting of W, Mo, Ta, Nb, Re and alloys thereof by reducing a corresponding metal halide in a gas phase by means of hydrogen gas, the improvement comprising the following steps in the order named:
   a. reducing the halide to form a partially reduced powder;
   b. mixing coarse-grained and fine-grained partially reduced powder;
   c. treating the powder at a temperature of 400–1,200° C. in an atmosphere comprising a halogen; and
   d. further reducing the powder to form a completely reduced metal powder.

7. In a method for affecting grain growth in the production of metal powder of metals selected from the group consisting of W, Mo, Ta, Nb, Re and alloys thereof by reducing a corresponding metal halide in a gas phase by means of hydrogen gas, the improvement comprising the following steps in the order named:
   a. reducing the halide to form a partially reduced powder;
   b. mixing coarse-grained and fine-grained partially reduced powder;
   c. comminuting the powder mechanically;
   d. treating the powder at a temperature of 400–1,200° C. in an atmosphere comprising a halogen; and
   e. further reducing the powder to form a completely reduced metal powder.

8. In a method for affecting grain growth in the production of metal powder of metals selected from the group consisting of W, Mo, Ta, Nb, Re and alloys thereof by reducing a corresponding metal halide in a gas phase by means of hydrogen gas, the improvement comprising the following steps in the order named:
   a. reducing the halide to form a completely reduced metal powder;
   b. mixing coarse-grained and fine-grained metal powder; and
   c. treating the powder at a temperature of 400–1,200° C. in an atmosphere comprising a halogen.

9. In a method for affecting grain growth in the production of metal powder of metals selected from the group consisting of W, Mo, Ta, Nb and Re and alloys thereof by reducing a corresponding metal halide in a gas phase by means of hydrogen gas, the improvement comprising the following steps in the order named:
   a. reducing the halide to form a completely reduced metal powder;
   b. mixing coarse-grained and fine-grained metal powder;
   c. comminuting the powder mechanically; and
   d. treating the powder at a temperature of 400–1,200° C. in an atmosphere comprising a halogen.

* * * * *